Sept. 7, 1937.  E. ZOERLEIN  2,092,269
IGNITION DISTRIBUTOR
Filed May 19, 1934   2 Sheets-Sheet 1
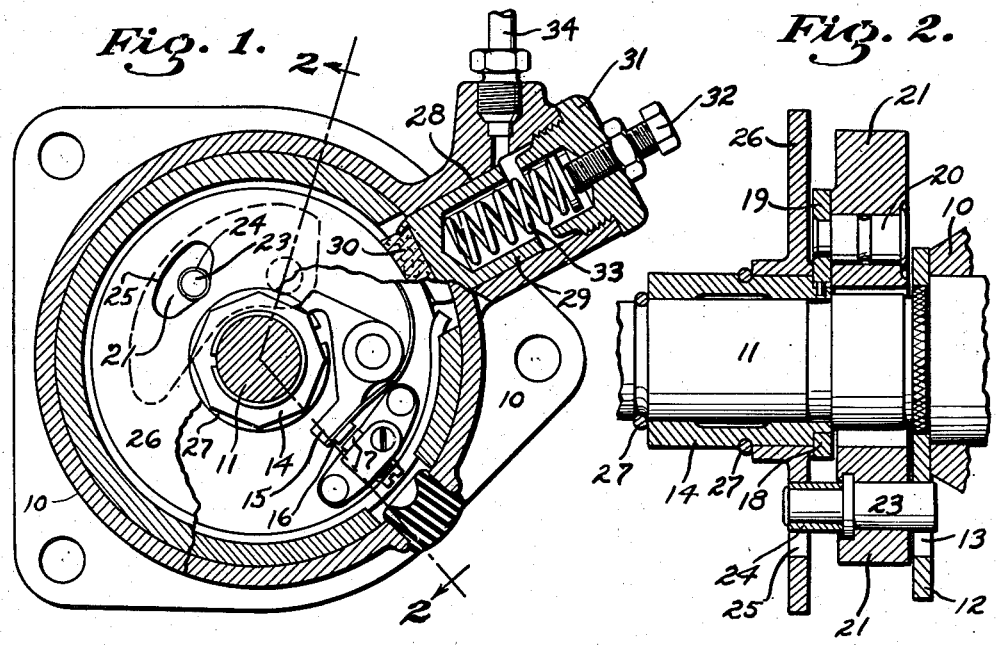
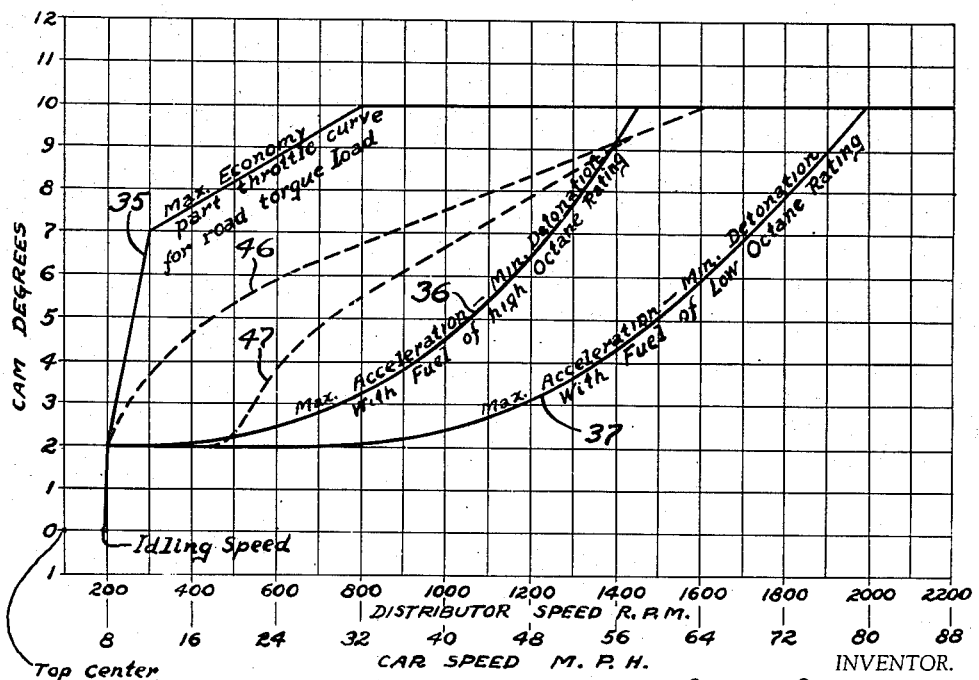

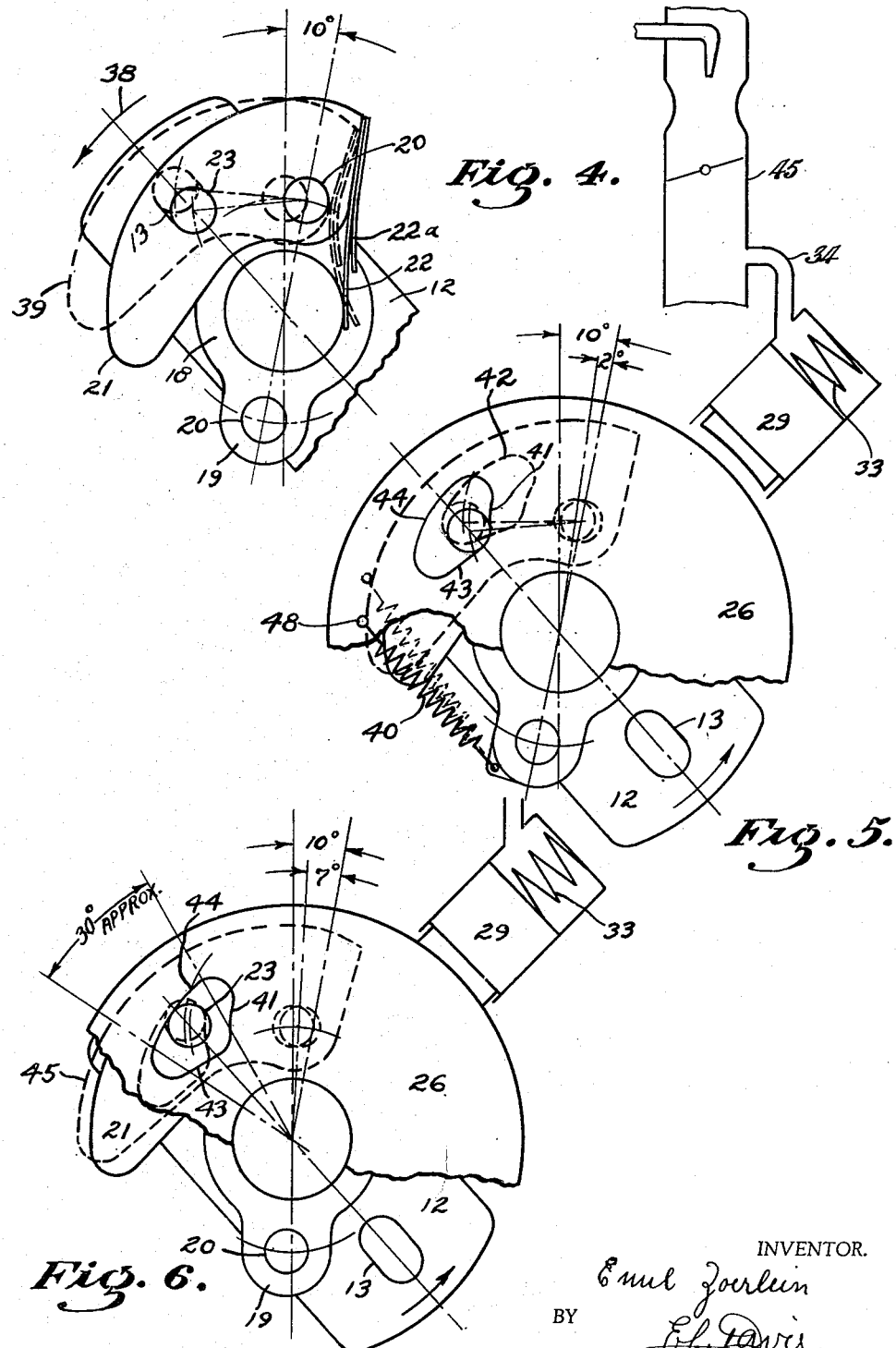

Patented Sept. 7, 1937

2,092,269

UNITED STATES PATENT OFFICE 2,092,269

IGNITION DISTRIBUTOR

Emil Zoerlein, Dearborn, Mich., assignor to Ford Motor Company, Dearborn, Mich., a corporation of Delaware Application May 19, 1934, Serial No. 726,453

17 Claims. (Cl. 123—117)

The object of my invention is to provide an ignition distributor especially suitable for internal-combustion engines which are used in motor vehicles. My invention relates specifically to fully automatic means for advancing the position of the ignition spark relative to the pistons of the motor so as to obtain maximum fuel economy together with maximum power and acceleration.

Specifically, my invention comprises improvements to the well known vacuum brake type of distributor, as will be specifically brought out in the specification. This type of distributor comprises, a pair of centrifugally operated weights, the outward radial movement of which are spring resisted and which advance the position of a breaker point operating cam upon an increase in engine speed. A friction plate is fixed to said cam against which a spring urged plunger or piston bears so that the friction therebetween tends to retard the breaker cam and thereby necessitates a greater centrifugal force or higher speed of the weights to produce a given advance of the breaker cam. At normal road torque load, the friction between the spring loaded plunger and brake plate is lessened or eliminated by an increase in the vacuum in the engine intake manifold so that the cam position is controlled almost solely by the centrifugal weight position corresponding to the engine speed. When the engine accelerator pedal is depressed and the throttle is opened the intake manifold vacuum drops off which allows the plunger to frictionally resist rotation of the cam plate to a greater degree and consequently to thereby retard the position of the cam for any particular speed. This retarding action partially compensates for the greater cylinder compression obtained at full throttle. However, the device has limitations, as will be more fully brought out in the specification, which my improved device is designed to correct.

The general distributor construction, as outlined above, is not part of my invention, but rather, my invention comprises improvements to this well known structure which it is believed materially increases the efficiency of the distributor.

These improvements comprise; first, means for mechanically amplifying the effective resistance of the vacuum operated brake so as to increase the braking torque without increasing the friction produced therein. This construction permits the vacuum brake to be used at higher engine speeds without excessive friction being developed and further it allows the distributor to operate on the very low vacuum under which up-to-date carburetors are designed to function. An important result of this improvement is that the road torque load curve of the distributor may be designed independently of the retarded curve, so that both may be designed to correct their particular condition.

My second improvement comprises means whereby application of the vacuum operated brake, when the engine is idling, causes the spark to be advanced to a position giving maximum acceleration without detonation. The means for advancing the spark by the application of the friction brake is believed to be new and results in improved engine operation. Heretofore the sole function of the vacuum operated brake was to retard the advancing movement resulting from the centrifugal weights. In my distributor the application of the vacuum brake, when the engine is idling, causes the spark to be advanced to position for maximum acceleration and then upon an increase in engine speed the advancing movement caused by the centrifugal operated weights is retarded and controlled so as to produce maximum acceleration with minimum detonation. The result of this improvement is that the spark position for the engine when idling may be chosen solely to produce smooth engine operation, and the spark advance produced by the application of the vacuum brake chosen to give maximum engine acceleration. This advance to be effective must take place before the speed of the engine has increased so that such result cannot be obtained by the action of centrifugally operated weights.

With these and other objects in view, my invention consists in the arrangement, construction and combination of the various parts of my improved device, as described in the specification, claimed in my claims, and illustrated in the accompanying drawings in which:

Figure 1 shows a plan view of a distributor having my invention incorporated therein, portions of the distributor being broken away to better illustrate the construction.

Figure 2 is an enlarged sectional view, taken on the line 2—2 of Figure 1.

Figure 3 is a chart showing the advance curves of my distributor in contrast to advance curves of a similar distributor not having my improvements incorporated therein.

Figure 4 is a diagrammatic view, illustrating the construction whereby radial movement of a centrifugal weight advances the position of the spark. This general construction is old and forms no part of my invention, but is illustrated to bring out the operation of my improvements.

Figure 5 is a diagrammatic view illustrating the means whereby application of a vacuum operated brake, when the engine is idling, causes an initial advance of the spark through a distance of approximately two degrees, and Figure 6 is a diagrammatic view illustrating the means for mechanically amplifying and controlling the effectiveness of the vacuum operated brake in retarding the advancing movement caused by the centrifugal operation of the advancing weights.

Referring to the accompanying drawings, particularly Figures 1 and 2, I have used the reference numeral 10 to indicate a conventional distributor housing in which a distributor shaft 11 is rotatably mounted, this shaft being driven at one-half engine speed directly from the engine cam shaft. A rectangularly shaped plate 12 is fixedly secured to the shaft 11, this plate forming the means for driving the rotating parts of the distributor. Two diametrically opposed radially extending elongated slots 13 are provided in the plate 12 in which suitable pins, about to be described, extend so as to drive the rotating parts of the distributor. A contact point operating cam 14 is rotatably mounted upon the shaft 11, this cam being provided with a plurality of cam lobes thereon which actuate one or more contact point arms 15 in the conventional manner. A contact point 16 is fixedly secured to the free end of each arm 15, this contact point being alternately opened and closed with a stationary point 17 to complete and break the primary circuit of the ignition system in the conventional manner.

Referring to Figure 2 it will be noted that a ring shaped driven plate 18 is fixedly secured to the inner end of the cam 14, this plate having a pair of ears 19 formed thereon in each of which a fulcrum pin 20 is fixedly secured. A segment shaped weight 21 is pivotally mounted upon each of the pins 20 at a point spaced from its center of gravity so that upon rotation of the plate 18 the free ends of the weights will tend to swing outwardly in the conventional manner. To resist the outward radial movements of these weights and return same to their inner positions, a pair of flat leaf springs 22 and 22—a are fixed to each weight, these springs bearing against the shaft 11 to return the weights to their inoperative positions.

It will be noted that a pin 23 is fixed at substantially the center of each of the weights 21, these pins projecting through and extending from each side of the weights with one end of each pin projecting into one of the slots 13. Upon the other end of each pin 23 I have provided a roller 24, these rollers projecting into a pair of cam openings 25 which are formed in a friction plate 26, which plate is rotatably mounted upon the cam ring 14. A pair of split retaining rings 27 secure the cam ring 14 and plate 26 in their normal assembled position.

Referring to Figure 1 it will be noted that the housing 10 is provided with a radially extending cylindrical bore 28 therein in which a plunger 29 is reciprocally mounted, this plunger having a leather friction shoe 30 secured to the inner end thereof, which shoe is adapted to bear against the periphery of the plate 26 when moved inwardly towards the axis of the shaft 11. A cap 31 is secured over the outer end of the bore 28 in which an adjusting screw 32 is threaded and which screw governs the tension of a spring 33 which is interposed between the plunger 29 and the end of the screw 32. A suitable conduit 34 extends from position just above the plunger 29 to the engine intake manifold. This manifold is shown diagrammatically by numeral 49 in Figure 5. These parts are so designed that the vacuum produced in the intake manifold upon part opening of the carburetor throttle is sufficient to draw the plunger 29 against the force of the spring 33 away from contact with the friction plate 26.

Before describing the operation of the distributor just described, it may be well to refer to the chart shown in Figure 3. The several curves shown on this chart have been laid out with their ordinates plotted in degrees of cam movement advanced from the top center of the piston, and with their abscissas in both revolutions per minute of the distributor cam and in miles per hour of the vehicle in which the device is used. The curves shown represent the advance in degrees of the contact point operating cam 14 for engine speed up to 4400 R. P. M., when operating upon part throttle, full throttle with fuel of high octane rating and full throttle with fuel of low octane rating.

It will be noted from this chart that the position of the spark for an idling speed of the engine is shown at zero degrees advance, with a cam speed of approximately 180 R. P. M., this being a motor speed of 360 R. P. M. This results in very smooth idling of the motor; although, when it is desired to accelerate the motor, a spark advance of approximately two degrees at substantially this same idling speed is very desirable. Consequently, a theoretically correct distributor must advance the spark from a zero idling speed position to about two degrees without an increase in engine speed to obtain maximum acceleration. Consequently, something other than a centrifugally operated weight must therefore be relied upon to effect this initial advance. It will subsequently be shown how the applicant's distributor affects this initial advance movement instantly upon the opening of the engine carburetor and before an increase in engine speed has resulted.

In Figure 3, the line 35 represents the relatively fast advance of the cam for maximum economy with part throttle opening for road torque load. This curve is not an acceleration curve but rather, shows the theoretically correct position of the spark when the engine has attained any particular speed and is operating uniformly at such speed, with a part throttle opening. For example, a uniform distributor speed of 300 R. P. M. with part throttle requires, for greatest economy, a cam advance of seven degrees, while a uniform part throttle speed of 800 R. P. M. requires a cam advance of ten degrees. Dynamometer tests have shown that for uniform part throttle speeds above 800 R. P. M. no gain in economy is made by further advancing the cam position. Consequently, ten degrees has been chosen as the maximum advance for the cam. It is, of course, understood that the curve 35 represents the spark position for greatest economy only with part throttle opening of the carburetor wherein the fuel compression in the cylinders is necessarily very low. This curve is ordinarily referred to as the "free curve" or part throttle curve for road torque load, it being the curve through which the centrifugal weights alone maintain the cam 14 for each engine speed.

I have shown by line 36, in Figure 3, the maximum desirable spark advance curve permissible under full throttle with a fuel of high octane rating and which will produce minimum detonation. It is possible to operate a motor with a greater spark advance than shown by curve 36; however, such increased advance produces an inaudible detonation which decreases the power of the motor although an audible knock is not apparent until a considerable increase is made. It will be noted that curve 36 starts at approximately two degrees and does not reach four and one-half degrees until 1000 R. P. M. of the distributor is reached. The full advance of ten degrees occurs at approximately 1450 R. P. M. of the device.

The curve shown by line 37 is plotted for maximum power and acceleration with minimum detonation using fuel of a low octane rating from which it will be seen that it is not desirable to advance the spark more than two degrees for distributor speeds as high as 800 R. P. M., while at speeds of 1500 R. P. M. a cam advance of only five degrees is permissible. The maximum advance of ten degrees is not desirable until a cam speed of 2000 R. P. M. has been reached, which speed is equivalent to approximately 80 miles per hour in the usual automotive vehicle. Curves 36 and 37 are ordinarily referred to as "power curves" of the distributor.

The foregoing has been brought out to show the exacting requirements of a distributor which will produce maximum fuel economy with part throttle opening while at the same time producing maximum power and acceleration under full throttle opening in connection with a motor using fuels of both high and low octane ratings. It will be noted that curves 36 or 37 cannot be even approximated by retarding the free curve 35; that is, by placing a resistance upon the action of the centrifugal weights so that the curve 35 starts at around 800 R. P. M. In such case the power curve would be a facsimile of the free curve and would be much too slow for both high and low speeds or much too fast for intermediate speeds. This is what is attempted in the conventional distributor wherein the vacuum brake acts directly upon the contact point operating cam. Consequently, in such distributors compromise curves must be chosen, which curves give neither maximum fuel economy nor maximum power or acceleration.

Perhaps the greatest improvement in my distributor arises because the free curve may be chosen for maximum fuel economy at part throttle while the power curve may be chosen entirely independent of the free curve.

Further, due to the relatively great range between the curves 36 or 37 and the curve 35, an increased amount of work must be done by the vacuum operated brake, even up to 80 miles per hour so that; if the conventional brake were used, excessive heating of the device would result. This excessive heating is prevented by the applicant by providing a torque amplifying device between the friction brake and the centrifugal weights so that only the conventional brake is required, although an increased force is provided to counteract the centrifugal force upon the weights 21.

Referring now to the operation of the distributor, as shown in Figure 4, it will be noted that movement of the weights 21 radially and around the pins 20 causes the pins 23 to move outwardly in the slots 13 thereby drawing the pins 20 in the direction of arrow 38 through a maximum angular range of ten degrees, as shown by dotted lines 39. This action is resisted by the leaf springs 22 and 22—a. I have provided these two leaf springs having different characteristics for each weight, the longer of the two alone resisting the outward movement of its weight up to approximately 300 R. P. M. of the device at which speed the other spring 22—a also comes into play so that any further radial movement of the weight is resisted by the combined force of both springs. Consequently, the curve 35 between the speeds of 300 and 800 R. P. M. is considerably flatter than the curve up to 300 R. P. M. The initial tension on the springs 22 is sufficient to maintain the weights at their innermost positions up to about 200 R. P. M. so that at the idling speed of the engine no advance in spark occurs.

Referring to Figure 5, I have shown the position of the friction plate 26 when the motor is idling. I have provided a tension spring 40 between each of the ears 19 and suitable pins 48 on the plate 26, which springs tend to rotate the friction plate in a counterclockwise direction relative to the cam plate 18. These springs force the rollers 24 towards the right hand end of their openings 25; however, the openings 25 are curved at this point numbered 41 with the center of curvature coinciding with the pivots 20 so that the springs 40 are capable of moving plate 26 only until the rollers 24 bear against the faces 41. The position shown by solid lines in Figure 5 is the free position of the plate 26 and consequently, is the position in which the device functions when the engine is idling or when it is inoperative. When the engine is idling and the vehicle accelerator is depressed the vacuum in the intake manifolds immediately drops to practically zero so that the spring 33 pushes the plunger 29 against the periphery of friction plate 26. Inasmuch as the driven plate 18 is being rotated in a counterclockwise direction by the engine, the friction produced by the plunger 29 causes the plate 26 to lag or assume the position as shown by dotted lines 42, relative to the rollers 24. Due to the cam face 43 of each opening 25 having a slight rise the rollers 24 are forced outwardly to thereby advance the spark position approximately two degrees. This advance movement results solely from the application of the friction brake which is caused by the operation of the engine accelerator and is not the result of a centrifugal force developed in the weights 21. The springs 22 are tensioned to retain the weights 21 in their inoperative positions against centrifugal force at idling speeds but are not sufficiently tensioned to retain the weights in their inoperative positions against the force exerted upon the rollers 24 by the cam faces 43 upon the application of the friction brake. It will thus be seen that the cam 43 advances the spark immediately upon the operation of the engine accelerator.

Referring to Figure 6, I have shown in full lines the position of the plate 26 in relation to the rollers 24 when the engine is rotating approximately 2200 R. P. M. At this speed the weights 21 tend to swing outwardly, which movement is partly resisted by the spring 22 and at the same time also resisted by cam faces 44 which are formed on the outer edges of each opening 25. In order for the weights 21 to move freely in a radial direction under only the restraining force of the springs 22, it is essential that no peripheral braking resistance be applied to the plate 26. Conversely, when the device is rotating in its normal counterclockwise direction, a frictional resistance applied at the periphery of the disc 26 will, through the cam faces 44, urge the rollers 24 and weights 21, to their inward positions. The angle of the cam face 44 has been designed so that a clockwise movement of the plate 26 through about thirty degrees, relative to the plate 12, will draw the weights 21 from their outermost to their innermost positions. This function could be accomplished by a clockwise movement of the plate 18 through ten degrees but, of course, three times as much torque would be required to move the plate 18 as is required to move the plate 26. Consequently, nearly four times as great a weight retarding force will result when a given vacuum brake is applied to the plate 26 as when such brake is applied to the member 18, as is done in the conventional distributor. The angle of the cam face 44 may, of course, be designed to produce more or less mechanical amplification of the braking force, as desired. This feature is highly important for the reason that the weights 21 must be made heavy enough to advance the cam 14 against the work being done in oscillating the contact point arms 15 and consequently, considerable friction has heretofore been required to retard the movement of this cam upon acceleration. Experience has shown that excessive heat is developed by the brake when the spring pressure on the plunger 29 is made great enough to retard the conventional distributor through a range equivalent to the applicant's range. Still further, due to the lower degree of vacuum employed in present day automobile engines a much larger plunger 29 would be required in the conventional distributor to counteract the heavier spring pressure required.

A further important feature of this device is that the contour of the cam face 44 is designed to produce a variable leverage for different distributor speeds. Thus, the points along the curve 36 may be selected according to the engine and fuel requirements and need not resemble the free curve 35. This result cannot be obtained with the conventional distributor and consequently, compromise free and power curves must be selected in such devices. Dotted lines 45 show the fully advanced position of the power curve and represent a car speed of 58 miles per hour on the curve 36.

Referring to Figure 3, it will be noted that I have shown by dotted lines curves 46 and 47 which represent respectively the best free and power curves obtainable with the conventional distributor. It will be seen that the free curve 46 represents a much slower advance than the applicant's free curve 35 and further that the curve 47 produces a greater advance than the applicant's maximum acceleration curve 36. If curve 46 were made to approximate the curve 35, which could readily be done, then curve 47 would necessarily be much too far advance for acceleration between 40 and 50 miles per hour and the motor would knock at this speed. This might be overcome by producing greater friction on the brake 29; however, in such case, the power curve would be much too retarded for speeds up to 40 miles per hour.

The many advantages arising from the use of my improved distributor may be summarized by stating that the free curve or the part throttle curve for maximum economy may be designed independently of the maximum power and acceleration curve and that both of these curves may be widely separated without requiring excessive friction in the brake retarding device.

Still further, the position of the spark for idling may be chosen to produce some operation in any particular engine and without increasing the speed of the engine, the spark will be automatically advanced to position for maximum acceleration when the accelerator pedal is depressed. Consequently, quick pick-up of the engine is assured.

Some changes may be made in the arrangement, construction and combination of the several parts comprising my improved device without departing from the spirit of my invention, and it is my intention to cover by my claims such changes as may reasonably be included within the scope thereof.

I claim as my invention:

1. An internal-combustion engine distributor comprising, advancing mechanism which tends to advance the ignition spark upon an increase in the speed of the engine, and retarding mechanism which tends to retard the ignition spark upon the opening of the engine throttle valve, said retarding mechanism being connected to said advancing mechanism through a torque amplifying device, so that a relatively small retarding force will counteract a much larger advancing force.

2. A device, as claimed in claim 1, wherein said retarding mechanism comprises a vacuum operated brake which is actuated by a reduction in vacuum in the engine intake manifold.

3. A device, as claimed in claim 1, wherein said advancing mechanism comprises a pair of centrifugally operated weights and wherein said retarding mechanism comprises a vacuum operated brake which is actuated by a reduction in vacuum in the engine intake manifold.

4. An internal-combustion engine distributor comprising, advancing mechanism which tends to advance the ignition spark upon an increase in the speed of the engine, and retarding mechanism which tends to retard the ignition spark upon the opening of the engine throttle valve, and an operable connection between said retarding and advancing mechanisms, said connection effecting a variable leverage between said mechanisms which causes a unit retarding force to effect a greater spark retardation at one speed than at another speed.

5. A device, as claimed in claim 4, wherein said advancing mechanism tends to advance the ignition spark a proportionately greater amount for slow engine speeds so as to provide a free curve having a faster spark advance for slow engine speeds than for high speeds and wherein said leverage mechanism so alters the effectiveness of said retarding mechanism that a retarded or power curve is provided having a faster spark advance at high engine speeds than at slow speeds.

6. An internal-combustion engine distributor comprising, centrifugally operated mechanism which resiliently advances the ignition spark upon an increase in the speed of the engine, a brake actuated by a reduction in vacuum in the engine intake manifold, and amplifying means connecting said brake to said spark advancing mechanism so that a relatively small braking force will counteract a much larger spark advancing force to thereby retard said spark upon a reduction in said vacuum.

7. An internal-combustion engine distributor comprising, centrifugally operated spark advancing mechanism which resiliently advances the engine spark due to an increase in the speed of the engine, a friction producing means for resisting said advancing movement actuated by a reduction in the engine intake manifold vacuum, and means connecting said friction mechanism with said spark advancing mechanism through a controlled variable effective leverage whereby the free and retarded spark advance curves of said distributor may be designed independently of each other.

8. An internal-combustion engine distributor comprising, a contact point operating cam, a pair of centrifugally operated weights adapted to resiliently advance said cam upon a radial movement of the weights due to an increase in the speed of the distributor, and means for frictionally resisting said radial movement through a mechanical amplifying mechanism whereby a relatively small resisting force will counteract a much larger centrifugal force in said weights.

9. An internal-combustion engine distributor comprising, a distributor cam adapted to operate the contact points of said distributor, a weight mounted to rotate in said distributor and connected to said cam so that the centrifugal force of said rotating weight tends to advance said cam, operative means for counteracting said force, said means being connected to said weights by a torque amplifying mechanism.

10. A device, as claimed in claim 9, wherein said torque amplifying mechanism varies in degree for different speeds of the distributor.

11. An internal-combustion engine distributor comprising, a contact point operating cam, a centrifugally operated weight adapted to advance the timed position of said cam upon a radial movement due to an increase in the speed of said distributor, a friction plate rotatably mounted in said distributor relative to said cam, means for frictionally resisting rotation of said plate when it is desired to accelerate said engine, and means connecting said plate and said weight so that a relative retarding movement of said plate positively draws said weight inwardly against its centrifugal force to thereby retard said cam.

12. A device, as claimed in claim 11, wherein said connecting means mechanically amplifies the effect of the retarding torque of said plate in counteracting the centrifugal force in said weight.

13. A device, as claimed in claim 11, wherein said connecting means mechanically amplifies the effects of the retarding torque of said plate to different degrees for various speeds of said engine.

14. An internal-combustion engine distributor comprising, a distributor shaft, a driving plate having a pair of radially extending slots therein, said plate being fixed to said shaft, a contact point operating cam rotatably mounted upon said shaft, a fulcrum plate fixed to said cam, a pair of fulcrum pins fixed in said fulcrum plate upon each of which a centrifugally operated weight is pivotally mounted, the movable end of each weight having a guide pin extending therethrough with one end of each pin extending into its respective driving plate slot whereby rotation of said shaft will rotate said weights and cause same to be moved radially so as to advance the position of said fulcrum plate and said cam upon said shaft, a friction plate rotatably mounted relative to both said shaft and cam, and a friction brake which resists rotation of said friction plate upon a reduction in vacuum in the engine intake manifold, said friction plate having a pair of cam shaped apertures therein which coact respectively with the remaining ends of said guide pins, said cam apertures having faces therein arranged to positively move said weights inwardly upon a movement of said friction plate relative to said contact point cam in a direction contrary to the normal direction of rotation of said distributor shaft.

15. An internal-combustion engine distributor having a centrifugal operated weight therein which is arranged to advance the ignition spark upon an outward radial movement of said weight, means for rotating said governor weight in timed relation with said engine to thereby cause said outward movement, and means actuated by a reduction of the vacuum in the engine intake manifold effecting the outward movement of said weight independently of said rotating means.

16. An internal-combustion engine distributor comprising, centrifugal operated spark advancing mechanism, and means actuated by a reduction in the engine intake manifold vacuum for advancing said centrifugal operated mechanism independently of centrifugal force.

17. An internal-combustion engine distributor comprising, a housing, a cam rotatably mounted in said housing in position to intermittently open a pair of contact points, a pair of weights adapted to rotate with said cam, said weights being permitted radial centrifugal motion, the outward movement of which advances the relative position of said cam, a brake plate rotatably mounted in said housing relative to said cam, a vacuum operated brake arranged to resist rotation of said plate upon a reduction in the intake manifold vacuum, said plate being connected to said weights in such manner that the initial retarding movement of the plate forces said weights outwardly to thus advance the spark position while succeeding retarding movements of said plate force said weights inwardly to thus retard the spark position.

EMIL ZOERLEIN.